United States Patent [19]
Bergman

[11] 3,915,196
[45] Oct. 28, 1975

[54] CABLE-CUTTING SHUT-OFF VALVE

[75] Inventor: Warren C. Bergman, Clinton, N.J.

[73] Assignee: Valcor Engineering Corporation, Kenilworth, N.J.

[22] Filed: Sept. 10, 1973

[21] Appl. No.: 395,934

[52] U.S. Cl. ............................... 137/797; 137/68
[51] Int. Cl. ............................................. F16k 17/40
[58] Field of Search ........ 137/68, 797; 251/63, 318, 251/210; 285/3, 4

[56] References Cited
UNITED STATES PATENTS

| | | | |
|---|---|---|---|
| 1,999,493 | 4/1935 | White | 251/63 |
| 3,125,108 | 3/1964 | Murphy | 137/68 |
| 3,332,432 | 7/1967 | Marsh | 137/68 |
| 3,561,526 | 2/1971 | Williams et al. | 137/68 X |

*Primary Examiner*—William R. Cline
*Assistant Examiner*—Gerald A. Michalsky
*Attorney, Agent, or Firm*—Darby & Darby

[57] ABSTRACT

A valve for the emergency severing of a cable extending into a dangerous fluid environment and for simultaneously sealing off the dangerous fluid to prevent contamination of the environment on the safe side of the valve. The valve includes an explosively driven piston having a sharply angled end face which serves as a blade for severing the cable and also mates with a similarly angled valve seat to seal off the dangerous fluid. The pressure of the dangerous fluid urges the piston against the valve seat so as to maintain the seal.

8 Claims, 5 Drawing Figures

CABLE-CUTTING SHUT-OFF VALVE

This invention relates to shut-off valves, and, more particularly, to a valve for severing a cable extending into a dangerous fluid environment and sealing off the dangerous fluid.

In certain types of process control systems, such as for example nuclear reactor control systems, there is a need for operating various sensing devices and for manipulating various sytem controls located in an environment that is hostile to human life. In such situations, provision must be made for the remote operation of the sensing devices or system controls by human operators located in a safe area. One way of accomplishing such remote operation is by means of flexible steel cables extending from the safe area into the hostile environment. Such flexible steel cables may be hollow to carry electrical wires or other signal carrying media connected to a remote sensing device and/or may be driven in tension, compression or rotation to mechanically control system components within the hostile environment.

Because there exists the possibility of emergency situations involving the escape of dangerous fluid, such as for example radioactive gas or water, into the human-occupied "safe" area, there is a need for rapidly and positively sealing off the hostile environment. In order to make an effective seal, it is necessary to sever the flexible steel sensing and control cables extending into the hostile environment.

It is therefore an object of the present invention to provide a shut-off valve for simultaneously severing a steel cable and sealing off the dangerous fluid.

It is also an object of this invention to provide a shut-off valve that is capable of being operated by an electrically fired explosive squib under emergency conditions.

It is further object of this invention to provide a shut-off valve that is alternatively capable of manual operation.

It is another object of this invention to provide a shut-off valve in which the pressure of the dangerous fluid acts to maintain the valve members in sealing relation.

According to the above and other objects, a preferred embodiment of the present invention provides a shut-off valve including a chamber having a pair of opposed openings for a flexible cable, a piston adapted for axial movement within the chamber, one end of the piston having an angled face to form a blade for severing the cable at one side of the chamber, and a circumferential valve seat disposed within said chamber at an angle corresponding to the angled face of the piston to form a seal with the piston after the cable is severed. An electrically fired explosive squib is provided at the upper end of the chamber to drive the piston downward to sever the cable and engage the valve seat. The piston is provided with a circumferential shoulder against which the pressure of the dangerous fluid acts to maintain the seal between the piston and the valve seat.

The present shut-off valve may also be provided with a screw mechanism for manual operation.

Other objects and advantages of the present invention will be apparent from the following detailed description and accompanying drawings which set forth, by way of example, the principle of the present invention and the best mode contemplated of carrying out that principle.

IN THE DRAWINGS

Figure 1:
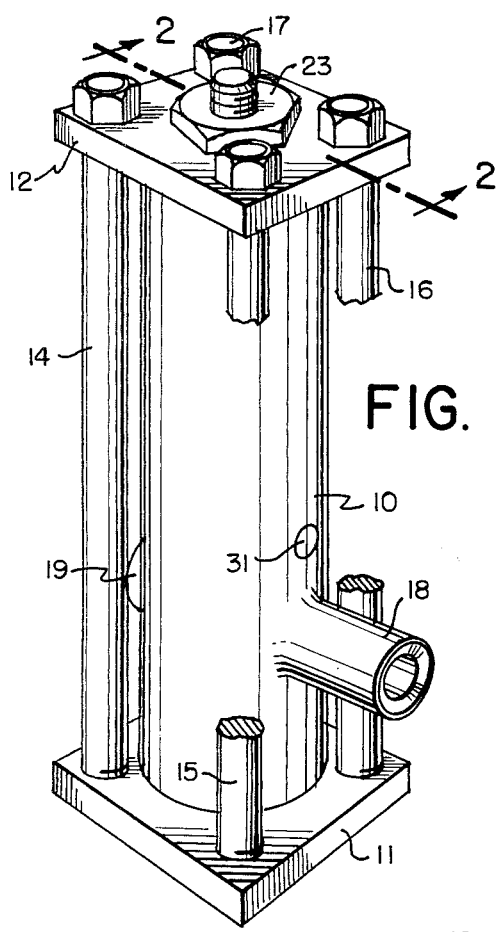
FIG. 1 is a perspective view, partially broken away, showing the exterior of the shut-off valve of the present invention.

Referring to FIG. 1 of the drawings, there is shown a perspective view of the preferred form of shut-off valve according to the present invention. The valve body 10 is of generally cylindrical shape and may be made of steel or other suitable material. A baseplate 11, preferably made of steel or other suitable material, fits into the lower end of valve body 10. A headplate 12, also made of steel or other suitable material, fits into the upper end of valve body 10. Baseplate 11 and headplate 12 are secured in position by tie rods 14, 15, 16 and 17. Tubes 18 and 19 project from opposite sides of the valve body 10 to provide a passage for the cable as will be explained in greater detail hereinafter. Tube 18 would normally be associated with the "hostile environment" side of the shut-off valve of the present invention.

Figure 2:
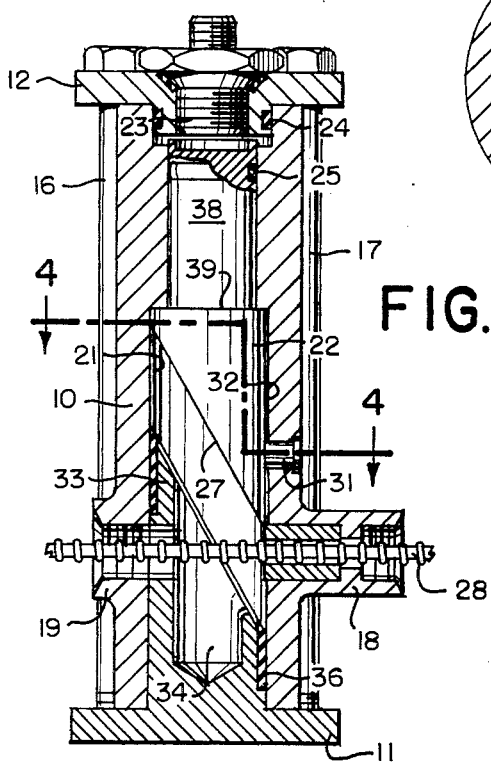
FIG. 2 is a cross-section, taken along the line 2—2 of FIG. 1 showing the present shut-off valve in its open or normal position.

Referring now to FIG. 2 of the drawings, there is shown a cross-sectional view taken along the line 2—2 of the valve shown in FIG. 1. The interior of the valve body 10 is an elongated valve chamber 21, preferably cylindrical in form. A cylindrical piston 22, preferably made of steel or other suitable material, fits closely within chamber 21, but is capable of moving freely in the axial direction from its upper, or "open", position shown in FIG. 2 to its lower, or "shut-off", position shown in FIG. 3.

Figure 3:
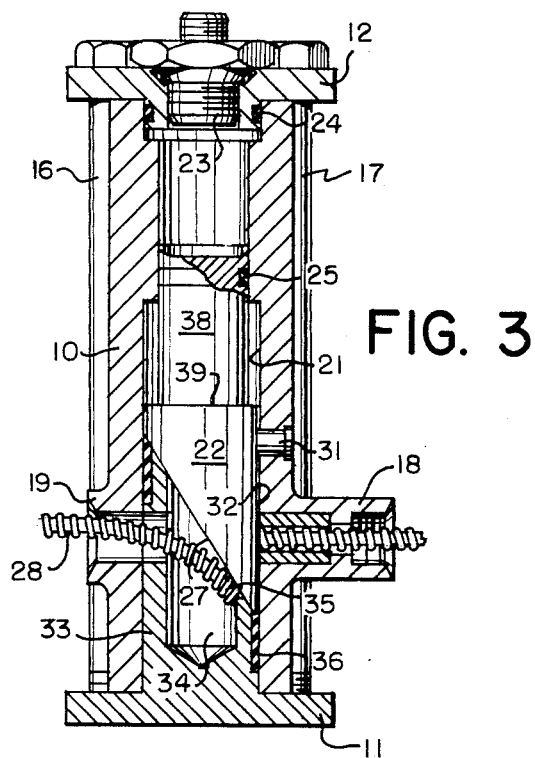
FIG. 3 is a cross-section of the present shut-off valve similar to FIG. 2 but showing the valve in its closed or shut-off position.

In the preferred form of the present invention, the piston 22 is driven from its open position shown in FIG. 2 to its closed position shown in FIG. 3 by an electrically fired squib 23 which is screw mounted into the headplate 12. The squib 23 may be of a conventional type, such as, for example, squibs made by Holex Inc. of Hollister, California.

The headplate 12 is provided with an O-ring seal 24 and the upper portion of the piston 22 is provided with an O-ring seal 25 to seal in the gases generated by the firing of the squib 23 so that the pressure of the gases will act to hold the piston 22 in its shut-off position shown in FIG. 3.

Figure 4:
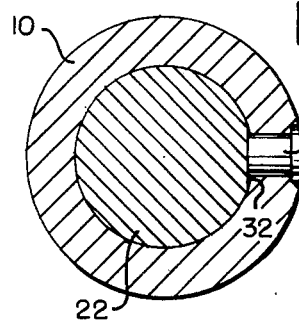
FIG. 4 is a cross-section taken along the line 4—4 of FIG. 2.

The lower end face 27 of piston 22 is sharply angled so as to form a blade for severing the cable 28 which extends through tubes 18 and 19 and valve chamber 21. The angle of end face 27 to the axis of piston 22 is preferably approximately 30° although any angle that will effectively sever the cable 28 can be used. The piston 22 is oriented so that its sharp edge will sever the cable 28 at the juncture between tube 18 and valve chamber 21. Piston 22 is maintained in the proper angular orientation by a key 31 which engages a longitudinal flattened portion or channel 32 of the piston 22 as shown in FIG. 4.

The cable 28 may be a conventional helically wound flexible control cable of the type commercially available from Teleflex Inc., of North Wales, Penna. The cable 28 may be driven in tension, compression or rotation to mechanically control system components within the hostile environment or may contain electrical wires connected to a remote sensing device or may serve as a conduit for a liquid or gas. It will be appreciated that the subject shut-off valve can also be used to sever and seal off other types of cables, rods, tubing or the like.

Referring to FIG. 3 of the drawings, it will be seen that the baseplate 11 extends upward within valve chamber 21 to form a circumferential valve seat 33 which contacts the angled face 27 of piston 22 when piston 22 is in the lower, or shut-off position. The center of the valve seat 33 is open or hollow to form a space or cavity 34 for the severed end 35 of cable 28 so that the severed end 35 does not interfere with the seal between valve seat 33 and the angled face 27 of piston 22.

In the preferred form of the present invention, valve seat 33 is provided with a resilient circumferential bushing or sealing member 36 to increase the effectiveness of the seal. Bushing 36 may be made of nylon or other suitable material. However, it will be apparent to those skilled in the art that, in a case where the hostile environment comprises a corrosive liquid or gas, the material of the bushing 36 and/or other components of the valve may be selected so as to handle the particular conditions.

The present shut-off valve is designed so that when the hostile environment comprises a liquid or gas under pressure, the pressure of the liquid or gas acts to maintain the seal between the valve seat 33 and face 27 of piston 22. More particularly, referring to FIGS. 2–4, liquid or gas that leaks back through tube 18 will pass through the small spaces between piston 22 and the wall of valve chamber 21 into the annular space between the valve chamber 21 and the upper portion 38 of piston 22 which is of somewhat reduced diameter. The pressure of the gas or liquid against the circumferential shoulder 39 of piston 22 urges the piston 22 downward into engagement with the valve seat 33 thus maintaining the seal. There is also a horizontal force component of pressure which tends to urge piston 22 away from tube 18 and toward tube 19 and thus further aid the seal between face 27 of piston 22 and the valve seat 23.

Figure 5:
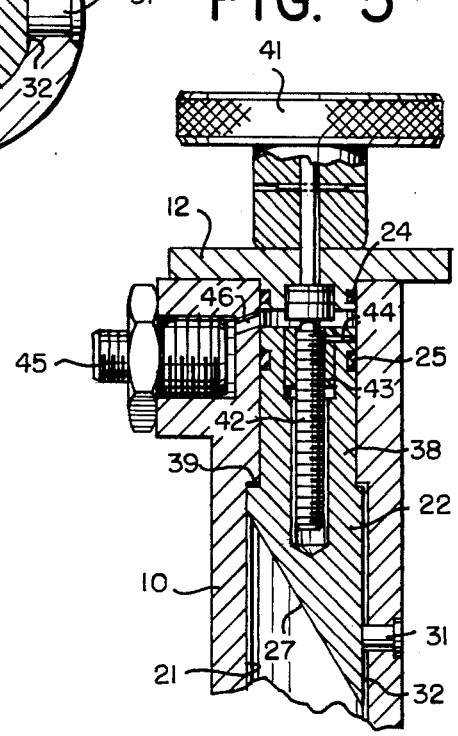
FIG. 5 is a cross-section of an alternative embodiment of the present shut-off valve capable of both manual and explosive operation.

Referring to FIG. 5 of the drawings, there is shown a cross-sectional view of an alternate embodiment of the shut-off valve of the present invention adapted for manual operation under non-emergency conditions. The valve shown in FIG. 5 may be manually closed to the shut-off position by twisting the handle 41 which is connected to a screw threaded stem 42 which engages a screw threaded sleeve 43 which is retained within the upper portion 38 of piston 22 by a shear pin 44. Alternatively, the shut-off valve shown in FIG. 5 may be actuated by squib 45 the gases from which are introduced into the upper portion of the valve chamber 21 by way of passage 46. The gas pressure causes the pin 44 to shear and drives the piston 22 downward to sever the cable (not shown) and mate with the valve seat (not shown). It will also be appreciated that the present shut-off valve may be actuated by other types of mechanical and/or pressure devices.

While the principle of the present invention has been illustrated by reference to illustrative embodiments of the present shut-off valve, it will be apparent to those skilled in the art that various modifications and adaptations of the illustrative embodiments may be made without departing from the spirit and scope of the present invention as set forth with particularity in the appended claims.

What is claimed is:

1. A shut-off valve comprising:
   a valve chamber having a pair of opposed openings defining a passage transverse to the axis of said valve chamber and adapted to receive a cable extending through said valve chamber;
   a piston member disposed within said valve chamber and adapted for axial movement from a first position clear of said passage to a second position blocking said passage, said piston member having an end face formed at an oblique angle to both said passage and the axis of said piston member, the leading edge of said end face of said piston member being adapted to sever a cable at a point adjacent one of said openings when said piston member is driven from said first position to said second position;
   valve seat means disposed within said valve chamber including a circumferential sealing portion disposed at an oblique angle to both said passage and the axis of said valve chamber for forming a seal with said end face of said piston member when said piston member is in said second position, and a central cavity for receiving the severed end of a cable so as to prevent the severed end of the cable from interfering with the seal between said circumferential sealing portion and said end face of said piston member; and
   means for driving said piston member from said first position to said second position.

2. The shut-off valve of claim 1 wherein said circumferential sealing portion of said valve seat means includes a resilient circumferential sealing member for forming a seal with the circumference of said end face of said piston member.

3. The shut-off valve of claim 1 wherein said means for driving said piston member comprises an explosive squib.

4. The shut-off valve of claim 3 further comprising sealing means for retaining the gases from said squib so that the pressure of said gases urges said piston member toward said second position to maintain the seal between said end face of said piston member and said circumferential sealing member.

5. The shut-off valve of claim 4 wherein said piston member includes a circumferential shoulder so that pressurized fluid introduced into said valve chamber from said one of said openings acts against said shoulder to urge said piston member toward said second position to maintain the seal between said end face of said piston member and said circumferential sealing member.

6. The shut-off valve of claim 5 wherein said valve chamber and said piston member are of circular cross-section.

7. The shut-off valve of claim 6 further comprising:
   a key projecting into said valve chamber; and
   a longitudinal channel formed in said piston member, said channel cooperating with said key to maintain a fixed angular relationship between said piston member and said valve chamber.

8. The shut-off valve of claim 1 wherein the angle of said end face and the axis of said piston member is approximately 30°.

\* \* \* \* \*